3,431,943
TEMPERATURE AND PRESSURE CONTROL
DEVICE FOR AUTOMOTIVE HEATERS
Walter R. Armand, 1320 Speet Blvd.,
Denver, Colo. 80204
Filed June 9, 1967, Ser. No. 644,936
U.S. Cl. 137—625.31        3 Claims
Int. Cl. F17d 1/00; F16k 21/02; B60h 1/02

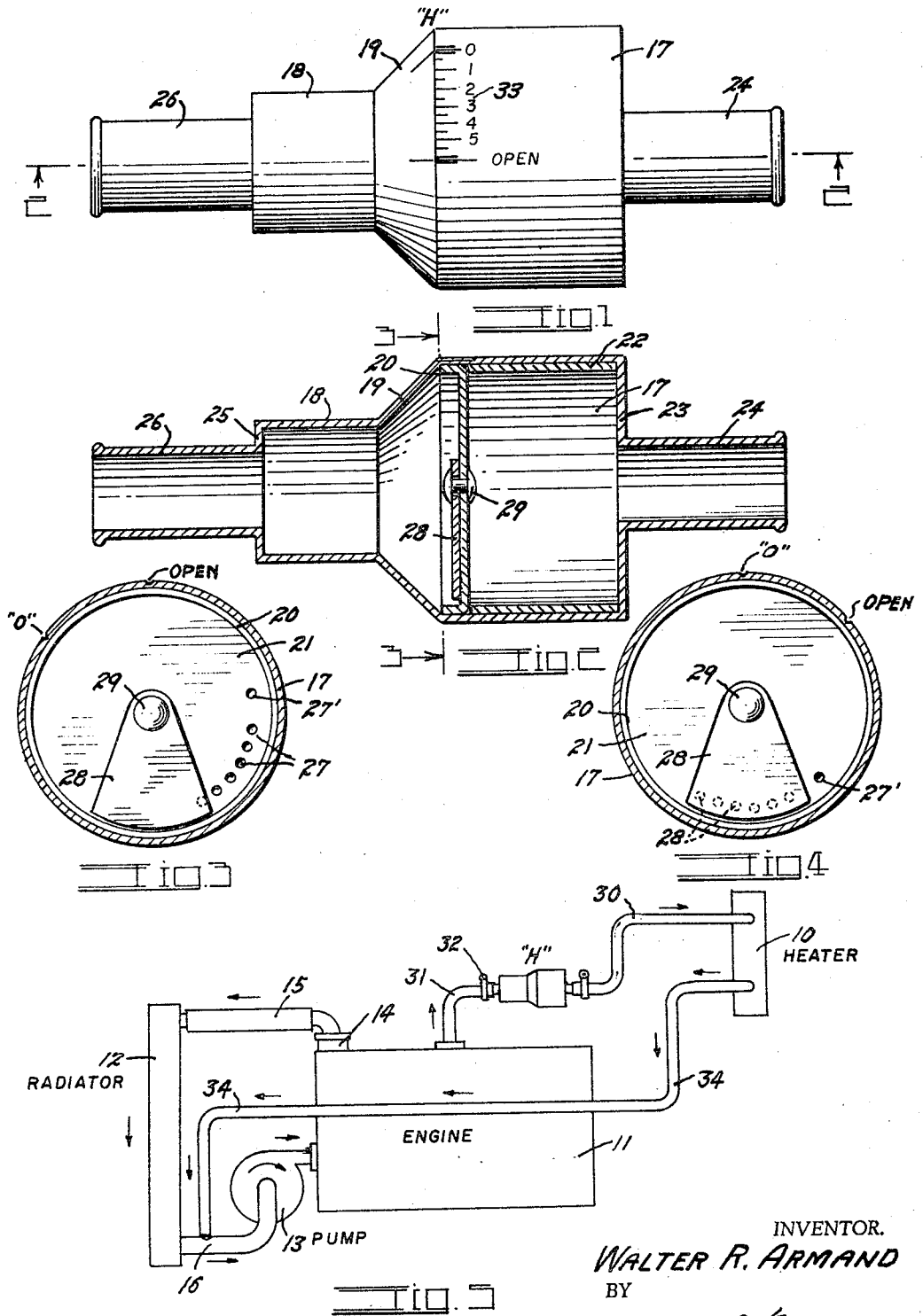

ABSTRACT OF THE DISCLOSURE

A housing for insertion in the water supply line to an automotive space heater having a relatively small intake chamber and a relatively large discharge chamber separated by a perforated partition containing a plurality of port holes and provided with means for placing any desired number of said holes in the active water circuit between said chambers, said discharge chamber being connected to the intake of the conventional water pump of the vehicle engine to partially evacuate said discharge chamber.

---

Automotive space heaters for heating the passenger space in present day cars are heated by passing water from the water jacket of the engine through heat-exchange coils in the heater. The present practice is objectionable due to the time required to produce useful heat after starting a cold engine and to the fact that, since the conventional radiator thermostat is closed when starting, racing of the engine or failure of the radiator thermostat to open will create sufficient heat and pressure to rupture the coils of the heater.

The principal object of this invention is to provide a temperature and pressure control device in the water line to the heater which will reduce the pressure in the heater below the pressure in the engine jacket to reduce the possibility of rupture and which will also reduce the amount of water flowing through the heater so that the lesser amount will heat more rapidly and reduce the usual delay in instigating the production of heat at the heater.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a detail top view of the temperature and pressure control device of this invention as it would appear when removed from the engine cooling system;

FIG. 2 is a longitudinal section of the device taken on the line 2—2, FIG. 1;

FIG. 3 is a cross section therethrough taken on the line 3—3, FIG. 1, showing the device in the fully opened position;

FIG. 4 is a similar section also taken on the line 3—3, FIG. 1 showing the device in the closed position; and FIG. 5 is a flow diagram of an automotive engine cooling system with this invention applied thereto.

In FIG. 5, conventional elements are diagrammatically illustrated and designated by reference numerals as follows: heater 10; engine 11; radiator 12; water pump 13; radiator thermostat 14; radiator supply hose 15; and radiator return hose 16. The direction of water flow is indicated by arrows.

To apply the present invention to the above conventional elements, a heater return conduit or hose 34 is connected between the heater 10 and the intake of the pump 13, a jacket conduit or hose 31 is connected to the water jacket of the engine 11 and a heater conduit or hose 30 is connected to the intake of the heater 10. The two hoses 31 and 30 are connected together by the device of this invention, indicated in its entirety at H in FIG. 5.

The improved control device H employs a duo-diameter, cylindrical housing, enclosing an expansion chamber 17 of relatively large diameter and an axially aligned, relatively smaller diameter pressure chamber 18. The two chambers are axially joined together by a truncated-conical portion 19. A peripheral flange 20 on a circular port plate 21 is urged against the conical incline of the portion 19 by means of a spacing sleeve 22 to form a partition between the pressure chamber and the expansion chamber. The spacing sleeve 22 fits snugly within the expansion chamber and is locked in place therein by means of a large end plate 23 from which a discharge hose nipple 24 axially projects. The end plate 23 is soldered or otherwise sealed to the cylindrical wall of the expansion chamber A small end plate 25, from which an intake hose nipple 26 axially projects, similarly seals the extremity of the pressure chamber 18.

A plurality of arcuately aligned, spaced-apart port holes 27 pierce the port plate 21 adjacent the circumference of the latter. A freely-swinging, sector-shaped valve plate 28 is positioned against the pressure chamber face of the port plate 21 and is freely suspended from an axially positioned pivot rivet 29. The width of the valve plate relative to the plurality of port holes 24 is such that in the closed position at least one of the holes will still be uncovered, as indicated at 27', so that complete closure is impossible.

The valve plate is gravitationally maintained in a substantially perpendicular, radial position in the enclosing housing. Therefore, the enclosing housing may be manually prepositioned to expose any desired number of holes, for instance, in FIG. 3, the housing has been prepositioned to expose all of the port holes 27 and in FIG. 4, the housing has been prepositioned to close all but one (27') of the port holes.

The housing is installed in the cooling system between the heater hose 30 and the water jacket hose 31 as shown in FIG. 5. The attachment is made by clamping the hoses 30 and 31 with conventional hose clamps 32 about the nipples 24 and 26.

The prepositioning of the housing H can be accomplished by loosening the hose clamps 32 and rotating the housing. To assist the prepositioning, a setting scale 33 is marked on or indented in the top of the housing as shown in FIG. 1. The installer can rotate the housing to position any desired indication on the scale 33 upwardly before tightening the clamps 32 to assure proper presetting of the port plate 21 relative to the sector-shaped valve plate 28 before tighting of the clamps 32.

The prepositioning of the device is dependent upon many things such as the mean temperature of the prevailing season, the capacity of the water pump, the capacities of the water jacket, radiator and heater jackets, the altitude at which the car will be operated, etc. It is a simple matter to regulate and can be quickly done by trial and error.

Let us assume the housing H has been prepositioned in the position of FIG. 4, with port holes exposed, and that the engine is cold and the radiator thermostat 14 closed. Now let us assume the engine is started. The only place the pump 13 can obtain water is from the expansion chamber 17 through the heater return hose 34 and the only place the heater can obtain water is from the one open orifice 27' in the port plate 21. Therefore, since the thermostat 14 is closed there is substantially no flow through the engine water jacket so that the water therein will by rapidly warmed and sucked through the heater by the suction of the pump long before the temperature reaches a point to open the main radiator thermostat 14 and start the normal circulation thereby greatly shortening the usual heat-awaiting period.

Should the engine be inexpertly raced during the starting period or should the thermostat 14 fail to open no damage will be done to the heater since no more water can flow therethrough due to the restricted port holes and the "starved" pump will create a zero or less than zero pressure in the expansion chamber 17 so that a cooling effect is attained, by the sudden expansion of the water entering through port hole 27' into the partially evacuated large chamber 17 which still further reduces the possibility of rupture or other damage to the coils of the heater 17.

To assist in correlating FIGS. 1, 3 and 4, one extremity of the scale 33 has been notched and indicated by the word "OPEN" and the other extremity is notched and designated by a zero, "0."

While a specific form of the invention has been described and illustrated herein, it is to be understood that the same may be varied within the scope of the appended claims, without departing from the spirit of the invention.

Having thus described the invention what is claimed and desired to be secured by Letters Patent is:

1. Means for controlling the water supply to an automotive type space heater from an engine water jacket comprising:
    (a) an axially-horizontal, cylindrical expansion chamber;
    (b) a circular end plate closing the outer extremity of said expansion chamber;
    (c) a first external hose nipple axially projecting from and communicating thru said end plate and adapted to be connected to said space heater;
    (d) a vertical, circular, port plate affixed in and closing the inner extremity of said expansion chamber, the lower portion of said port plate being provided with a plurality of horizontally-spaced-apart port holes;
    (e) a pivot element centrally mounted on said circular port plate;
    (f) a relatively flat valve plate pivoted on, and freely suspended from, said pivot element so as to gravitationally swing across said spaced-apart port holes;
    (g) a cylindrical pressure chamber of lesser diameter than said expansion chamber axially aligned with and peripherally sealed to the inner extremity of the latter; and
    (h) a second external hose nipple axially projecting from said pressure chamber and adapted to be connected to said water jacket.

2. Means for controlling the water supply to an automotive space heater as described in claim 1 in which the valve plate is positioned against the expansion-chamber-side of said port plate.

3. Means for controlling the water supply to an automotive space heater as described in claim 2 in which the width of the valve plate relative to the plurality of port holes is such that at least one of the holes will remain uncovered when the remainder of the holes are covered by the valve plate so that simultaneous closure of all of the holes will be impossible.

References Cited
UNITED STATES PATENTS

| | | | |
|---|---|---|---|
| 341,170 | 5/1886 | Reese | 137—625.31 X |
| 1,260,571 | 3/1918 | Peck | 137—625.31 |
| 1,711,901 | 5/1929 | Nelson | 236—34 |
| 2,684,081 | 7/1954 | Chace | 237—8 |
| 2,743,872 | 5/1956 | Wood et al. | 236—92 |

EDWARD J. MICHAEL, *Primary Examiner.*

U.S. Cl. X.R.

237—12.3